United States Patent [19]

Tsukada et al.

[11] 4,435,064

[45] Mar. 6, 1984

[54] OPTICAL EXPOSURE UNIT FOR ELECTROPHOTOGRAPHIC PRINTING DEVICE

[75] Inventors: Toshiji Tsukada; Kazuo Morinaga, both of Kanagawa, Japan

[73] Assignee: Ricoh Co., Ltd., Tokyo, Japan

[21] Appl. No.: 277,040

[22] Filed: Jun. 24, 1981

[30] Foreign Application Priority Data

Jun. 28, 1980 [JP] Japan ................................. 55-88371

[51] Int. Cl.³ ..................... G03B 27/00; G03G 15/00
[52] U.S. Cl. ...................................... 355/1; 355/3 R;
355/70; 354/5; 346/107 R
[58] Field of Search ................ 355/1, 3 R, 70; 101/1,
101/426; 350/96.24, 96.25, 96.27; 346/107 R,
108; 354/5

[56] References Cited

U.S. PATENT DOCUMENTS

| | | | |
|---|---|---|---|
| 3,824,604 | 7/1974 | Stein | 354/5 |
| 3,836,917 | 9/1974 | Mee | 354/5 |
| 4,090,206 | 5/1978 | Pfeifer et al. | 346/107 R |
| 4,096,486 | 6/1978 | Pfeifer et al. | 346/107 R |
| 4,107,687 | 8/1978 | Pfeifer et al. | 346/107 R |
| 4,279,483 | 7/1981 | England et al. | 354/5 |
| 4,297,022 | 10/1981 | Lester | 355/1 |
| 4,318,597 | 3/1982 | Kotani et al. | 355/1 X |
| 4,364,064 | 12/1982 | Baues | 355/1 |

Primary Examiner—R. L. Moses
Attorney, Agent, or Firm—Burgess, Ryan & Wayne

[57] ABSTRACT

An electrophotographic printing device is provided with an exposure unit comprising light-emitting diodes which are light sources and means for transmitting the light beams emitted from the light-emitting diodes and converging or focusing them like converging lenses, whereby electrostatic latent images of characters and the like are formed on the surface of a photosensitive member.

8 Claims, 20 Drawing Figures

OPTICAL EXPOSURE UNIT FOR ELECTROPHOTOGRAPHIC PRINTING DEVICE

BACKGROUND OF THE INVENTION

The present invention relates to an electrophotographic printing device of the type having an exposure unit comprising the combination of a plurality of light-emitting diodes which are light sources and a plurality of means for transmitting the light beams emitted from the light-emitting diodes and converging or focusing them like converging lenses (to be referred to as "the light-beam transmission-and-convergence means" in this specification). The last mentioned optical means may be, for instance, the products of Nippon Sheet Glass Co., Ltd. sold under the trademark of "SELFOC". This optical means is described in "Optical Characteristics of a Light-Focusing Fiber Guide and Its Applications", Uchida, et al, IEEE Journal of Quantum Electronics, Volume QE-6, No. 10, Page 606, Oct. 1970.

The prior art electrophotographic printing devices of the type having an exposure unit comprising a cathode-ray tube and an optical fiber plate (a plurality of optical fibers are arranged in a plate form) have been well known. The electron beam emitted from the cathode-ray tube is transmitted through the optical fiber plate so as to be focused on the surface of a photosensitive member. However, the optical fiber plate only has a function of transmitting the light beam therethrough and one end of the optical fiber plate is desirable to be made into contact with the surface of the photosensitive member. Furthermore, the optical fiber plate must be moved relative to the surface of the photosensitive member, so that the optical fiber plate must be spaced apart from the surface of the photosensitive member in order to avoid damage to the surface of the photosensitive member by friction. Thus, the prior art exposure unit must satisfy the above two requirements which are contradictory to each other. As a result, with the prior art exposure unit, a distance of from 50 to 100 μm must be maintained with a high degree of accuracy between the optical fiber plate and the surface of the photosensitive member. Therefore, the prior art exposure unit needs a mechanism for supporting the optical fiber plate which is complex in construction and which must support the optical fiber plate with a high degree of accuracy. As a result, the prior art exposure unit is very expensive. In addition, toner tends to adhere to the end surface of the optical fiber plate, so that exposures are adversely affected and subsequently the electrostatic latent images are degraded or deformed. Moreover, the use of a cathode-ray tube results in an increase in size of the exposure unit.

In order to make the exposure units compact in size, there has been proposed the use of light-emitting diodes. With the light-emitting diodes, the exposure units can be made 1/10 in size as compared with the exposure units using a cathode-ray tube. However, as with the cathode-ray tube exposure units, the distance between the end of the optical fiber plate and the surface of a photosensitive member must be strictly maintained. Thus, the light-emitting diode type exposure units still need a complex and expensive mechanism for supporting the optical fiber plate.

SUMMARY OF THE INVENTION

In view of the above, one of the objects of the present invention is to provide an electrophotographic printing device in which an exposure unit comprises a plurality of light-emitting diodes and a plurality of light-beam transmission-and-convergence means so that the focusing or converging power of the latter is effectively utilized so as to permit the inner end of the light-beam transmission-and-convergence means to be spaced apart from the surface of a photosensitive member by a relative long distance as compared with the prior art exposure units, whereby the prior art complex and precision optical fiber plate supporting mechanisms can be eliminated and consequently the exposure unit can be made compact in size and light in weight and inexpensive to fabricate.

According to a second embodiment of the present invention, a plurality of light-beam transmission-and-convergence means and a plurality of light-emitting diodes are disposed in a zig-zag form, respectively, in the direction perpendicular to the direction of the movement of the photosensitive member, whereby uniform exposures can be ensured and consequently high quality images can be formed.

According to a third embodiment of the present invention, a plurality of arrays each comprising a predetermined number of light-emitting diodes are disposed at an angle to the direction perpendicular to the direction of the movement of the photosensitive member, whereby the picture element density can be increased and consequently the resolution can be improved.

According to a fourth embodiment of the present invention, the moving speed of the photosensitive member is taken into consideration. Therefore, the light emitting aperture of each light-emitting diode is made into the form of an ellipse whose major axis is extended in the direction perpendicular to the movement of the photosensitive member, whereby an electrostatic latent image focused on the photosensitive member consists of picture elements which are almost circular and consequently the image quality can be remarkably improved.

According to a fifth embodiment, either or both of an array of light-emitting diodes and an array of light-beam transmission-and-convergence means are moved toward or away from the surface of the photosensitive member by an extremely small distance, whereby the diameter of each picture element can be arbitrarily selected.

The above and other objects, effects and features of the present invention will become more apparent from the following detailed description of preferred embodiments thereof taken in conjunction with the accompanying drawings.

DESCRIPTION OF THE PREFERRED EMBODIMENTS

Figure 1:
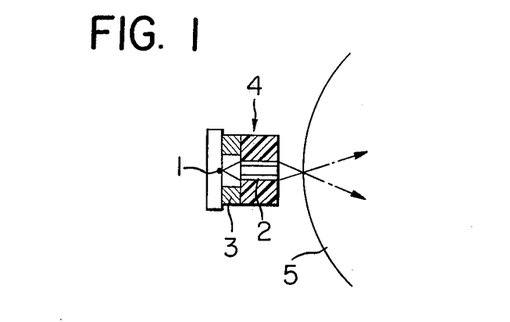
FIG. 1 shows a first embodiment of an exposure unit in accordance with the present invention.

In FIG. 1 is shown a first embodiment of the present invention. Assembled into a unitary construction are a subassembly of a plurality of light-emitting diodes 1 disposed at right angle to the plane of FIG. 1, a subassembly of a plurality of light-beam transmission-and-convergence means 2 disposed at a right angle to the plane of FIG. 1 and a spacer 3 interposed between the light-emitting diode subassembly and the light-beam transmission-and-convergence means subassembly. The assembly is then encapsulated with a resin or the like to provide an exposure unit 4. The light-beam transmission-and-convergence means 2 serve not only for transmitting the light beams emitted from the light-emitting diodes 1 but also for converging them like converging lenses. Therefore the light beams emitted from the light-emitting diodes 1 are transmitted through the spacer 3 into the light beam transmission-and-convergence means 2 so as to be focused upon a photosensitive medium 5. The distance between the downstream end (that is, the end facing the photosensitive medium 5) and the surface of the photosensitive medium 5 can be increased with an increase in focal length of the light beam transmission-and-convergence means 2.

Figure 2:
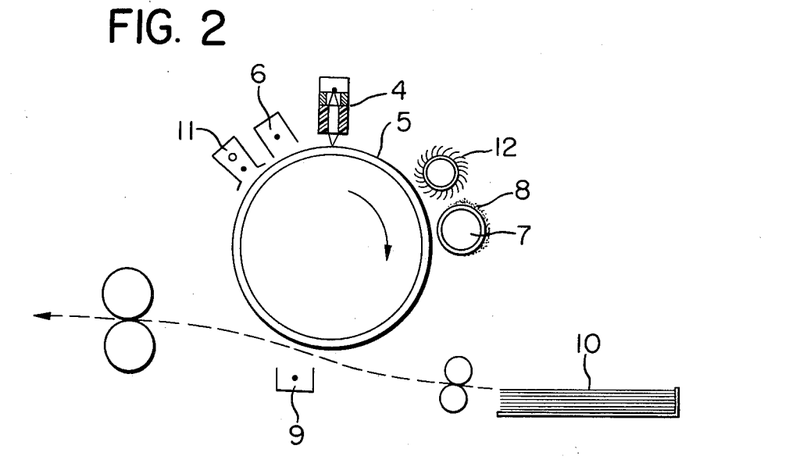
FIG. 2 is a view used for the explanation of the printing or recording process by an electrophotographic printing device incorporating the exposure unit shown in FIG. 1.

In FIG. 2 is shown an electrophotographic printing device utilizing the exposure unit 4 of the type described above. The printing or recording process is as follows. Initially, the photosensitive medium 5 is uniformly imparted with the charge by a charge electrode 6 and then exposed to the light beams emitted from the light-emitting diodes in the exposure unit 4 which are turned on depending upon a pattern to be copied, whereby an electrostatic latent image is formed over the photosensitive medium 5. Next, toner 8 is applied by a magnet roll 7 so as to develop the latent image into a visible toner image. The toner image is transferred by a transfer electrode 9 over a recording sheet 10. Thereafter, the remaining charge is dissipated by a discharging electrode 11 and the toner which still remains on the photosensitive medium 5 is removed by a fur brush 12 and the magnet roll 7. The toner image transferred over the recording sheet 10 is fixed by means of a fixing device (not shown).

According to the first embodiment, the exposure unit 4 can be made compact in size and can be spaced apart from the photosensitive medium 5 by a relatively great distance, so that the supporting mechanisms of the prior art electrophotographic printing devices which are complex in construction and expensive to fabricate can be eliminated. In addition, the distance between the exposure unit 4 and the photosensitive medium 5 can be easily adjusted. Furthermore, the fabrication costs can be considerably reduced. Moreover, the toner can be prevented from adhering to the inner end of the exposure unit 4.

Figure 3:
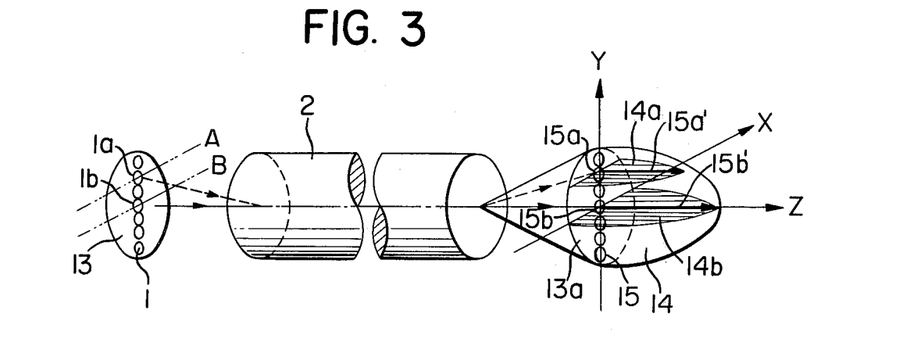
FIG. 3 is a view used for the explanation of the relationship between the incidence angle to a light-beam transmission-and-convergence means of the light beam emitted from a light-emitting diode and the illumination obtained on the surface of a photosensitive member by the light-beam transmitted through and focused by the light-beam transmission-and-convergence means.

FIG. 3 shows the relationship between the angle of incidence of the light ray incident on one end (facing the light source 13) of the light-beam transmission-and-convergence means 2 and the illuminance of the image formed by the means 2. If the light source 13 has a uniform brightness over its surface, the illuminance distribution of a spot of light 13a formed through the means 2 on the X-Y plane may be approximated by the spheroid 14 obtained by revolving an ellipse about the Z-axis. More specifically, the image of the diameter (indicated by the imaginary line B) of the light source 13 which is in parallel with the axis X has the illuminance distribution as indicated by the hatched area 14b. In like manner, the image of the chord (indicated by the imaginary line A) which is in parallel with the imaginary line B has the illuminance distribution as indicated by the hatched area 14a.

When instead of the circular light source 13, a straight array of light-emitting diodes 1 is placed at the same position, a straight array of images 15 of light-emitting diodes 1 is formed on the X-Y plane. The illuminance of the image 15b of the center light-diode 1b (which lies on the optical axis of the means 2) is indicated by the length of the line segment 15b' while the illuminance of the image 15a of the light-emitting diode 1a spaced apart radially outwardly from the center light-emitting diode 1b is indicated by the length of the line segment 15a'. It follows therefore that the farther a light-emitting diode 1 is spaced apart from the optical axis of the light-beam transmission-and-convergence means, the lower the illuminance of the image thereof becomes. When such variations in illuminance of images focused on the photosensitive medium occur, the picture elements are varied in toner density, and subsequently the toner image quality is degraded. This problem, however, can be solved according to the present invention as will be described below.

Figure 4:
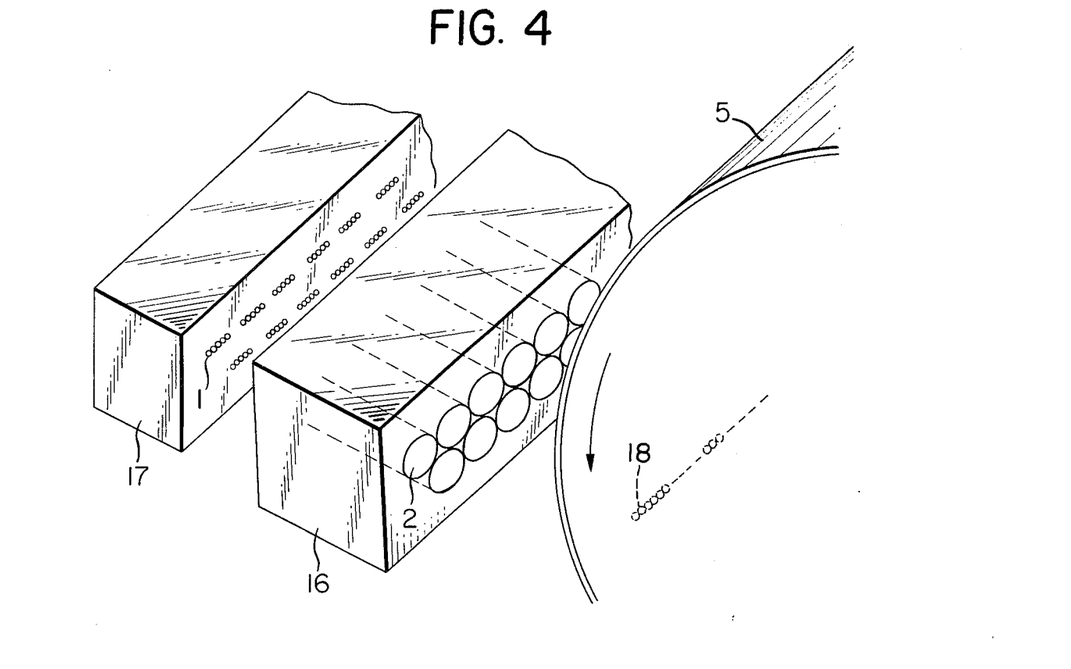
FIG. 4 is a schematic perspective view of a second embodiment of the present invention.

FIG. 4 shows a second embodiment of the present invention. One ends of a plurality of light-beam transmission-and-convergence means 2 are disposed in opposed relationship with the surface of the photosensitive medium 5 which rotates in one direction. Furthermore, they are arrayed in zig-zag in the direction perpendicular to the direction of movement of the photosensitive medium 5; that is, the direction in parallel with the axis of a photosensitive drum. (In this embodiment, it suffices to describe "in parallel with the axial direction of the photosensitive drum", but there does exist, for instance, a sheet type photosensitive medium which moves in one direction. Therefore, the expression of "the direction perpendicular to the direction of movement" is used.) These light-beam transmission-and-convergence means 2 are gathered together to construct a light-beam transmission-and-convergence unit 16.

A plurality of light-emitting diodes 1 are arrayed in the horizontal direction in opposed relationship with each end of the light-beam transmission-and-convergence means 2. They are gathered together to construct a light-emitting diode unit 17. When a light-emitting diode 1 is lighted, an electrostatic latent image 18 formed on the surface of the photosensitive medium 5.

Figure 5:
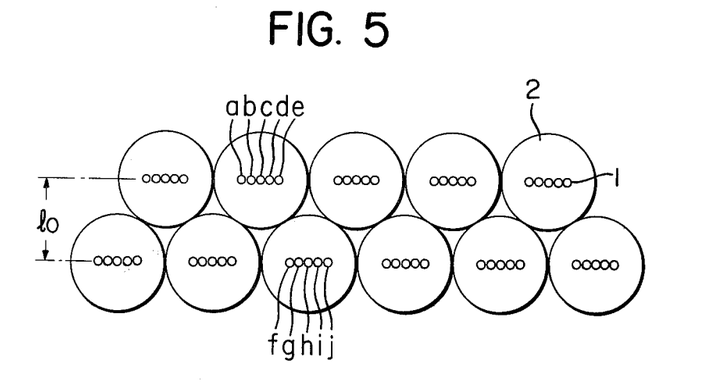
FIG. 5 shows the position relationships between the light-emitting diodes and the light-beam transmission-and-convergence means in the second embodiment.

FIG. 5 shows the detailed positional relationship between the light-beam transmission-and-convergence means 2 and the light-emitting diodes 1. In this example, five light-emitting diodes 1 are disposed in one row in opposed relationship with the center portion of each of the end face of each light-beam transmission-and-convergence means 2. For instance, the light-emitting diode array in the upper row is so disposed that it may be located between the adjacent light-emitting diode arrays in the lower row.

In this embodiment in which the light-beam transmission-and-convergence means 2 and the light-emitting diodes 1 are disposed in the manner described above, even when any of the light-emitting diodes in one array is turned on, the illuminance of the image focused on the surface of the photosensitive medium becomes substantially equal (because all the light-emitting diodes are located in the vicinity of the center portion of the end face of the light-beam transmission-and-convergence means), and consequently unevenness in density of the character images or the like can be eliminated.

However, when the light-diode arrays are disposed in two rows as shown in FIG. 4, there must be a time lag between the timing at which the light-emitting diodes in the upper row are turned on and the timing at which the light-emitting diodes in the lower row are turned on so that the straight horizontal electrostatic latent image as shown at 18 in FIG. 4 may be formed over the cylindrical surface of the photosensitive medium 5 which rotates in the direction indicated by an arrow.

Figure 6:
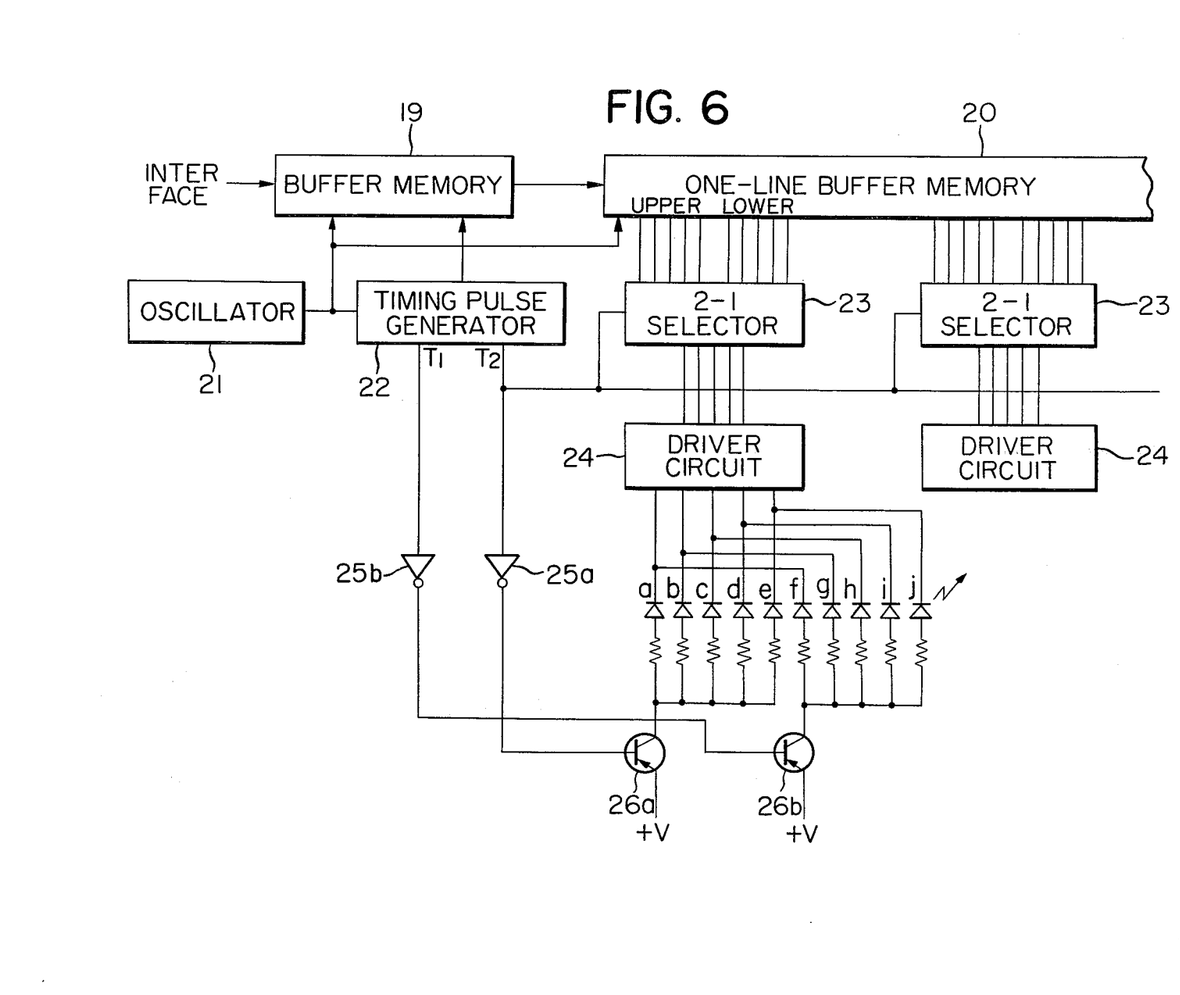
FIG. 6 is a diagram of a timing circuit used in the second embodiment.

To this end, as shown in FIG. 6 the present invention provides a circuit for controlling the timing for lighting light-emitting diodes (to be referred to as "the timing circuit" for brevity in this specification). The timing circuit includes a buffer memory 19 capable of storing character information and a (10×n) bit one-line buffer memory 20 which receives the picture element information in one line from the buffer memory 19. The number 10 represents the sum of the five light-emitting diodes a, b, c, d and e in one array in the upper row and the five light-emitting diodes f, g, h, i and j in one array in the lower row (See FIG. 5) and n represents the number of light-emitting diode array pairs in the upper and lower rows.

The timing circuit further includes an oscillator 21, a timing pulse generator 22, 2-1 selectors 23 for selecting the upper and lower rows, driver circuits 24, inverters 25a and 25b and transistors 26a and 26b.

In the step of forming an electrostatic latent straight horizontal line image as shown at 18 in FIG. 4, it is assumed that the distance between the upper and lower light-emitting diode rows be $l_o$ mm and the photosensitive medium 5 rotate at a speed of $l_1$ mm/sec. Then the light-emitting diodes in the lower row must be turned on $l_o/l_1$ sec after those in the upper row are turned on. Therefore, in response to a signal $T_1$ from the timing pulse generator 22, the 2-1 selectors 23 select the picture element information in the upper row and the driver circuits 24 cause the light-emitting diodes a through e in the upper row to be turned on. In response to a signal $T_2$ after $l_o/l_1$ sec, the selectors 23 select the picture element information in the lower row and the driver circuits 24 cause the light-emitting diodes f through j in the lower row to be turned on. The 2-1 selectors 23 and the driver circuits 24 must be equal in number n to the light-emitting diode array pairs in the upper and lower rows.

In summary, according to the second embodiment, the light-emitting diode arrays are disposed in the proximity of the extension of the axis of each light-beam transmission-and-convergence means 2 so that a light image with a uniform intensity can be focused on the cylindrical surface of the photosensitive medium 5 and consequently the toner image with a uniform density can be obtained. Thus, the image quality can be improved considerably. In order to form an image of a straight horizontal line across the surface of the photosensitive medium, the upper and lower arrays of light-emitting diodes are turned on and off independently of each other so that the loads on the power supply may be reduced.

In addition, the light-emitting diode arrays can be fabricated in the form of a tip so that the assembly is much facilitated.

Figure 7:
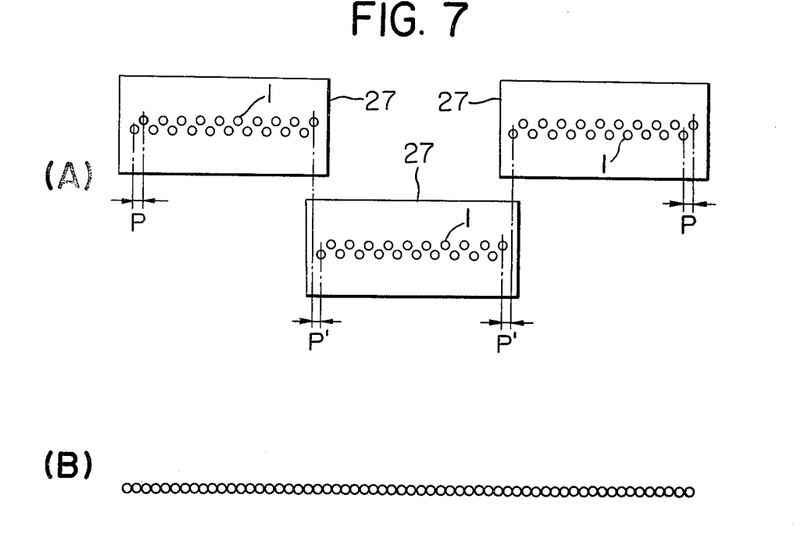
FIG. 7 shows an arrangement of light-emitting diode chips.

In order to increase the picture element density, the light-emitting diodes 1 may be arrayed in a zig-zag form in each chip 27 as shown at (A) in FIG. 7. When the light-emitting diode chips 27 are disposed in a zig-zag form in the direction perpendicular to the direction of rotation of the photosensitive medium 5, the pitch distance p' between the last light-emitting diode in one chip 27 and the first light-emitting diode in the adjacent tip 27 must be equal to the pitch distance p between the adjacent light-emitting diodes in each chip 27. Then, the spots of light and hence the toner dots or picture elements are made into intimate contact with the adjacent ones in a straight line as shown at (B) in FIG. 7, whereby the image quality can be further improved.

Figure 8:
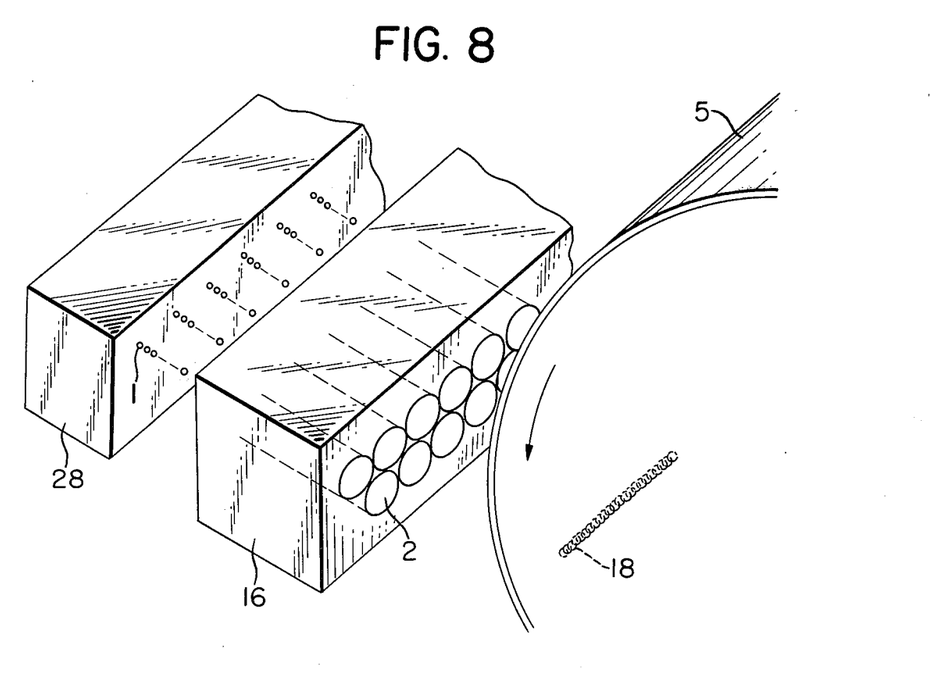
FIG. 8 is a schematic perspective view of a third embodiment of the present invention.

In FIG. 8 is shown a third embodiment of the present invention which is substantially similar in construction to the second embodiment shown in FIG. 4 except that the light-emitting diode arrays are inclined at an angle to the direction perpendicular to the direction of the rotation of the photosensitive medium 5 so that the picture element density is increased.

Figure 9A:
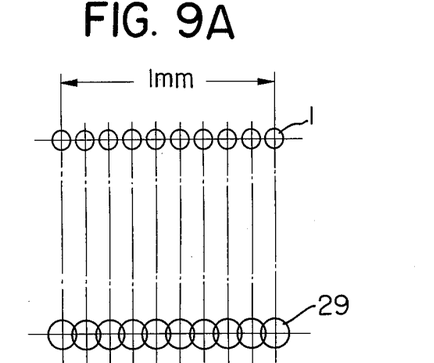
FIG. 9A is a view used for the explanation of the relationship between a straight array of light-emitting diodes and a resulting array of spots of light or picture elements.

When, as shown in FIG. 9A, ten light-emitting diodes are arrayed in one row at a pitch distance of 0.111 mm over the length of 1 mm, the spots of light (or the picture elements) 29 focused on the photosensitive medium 5 also have the same pitch distance of 0.111 mm. The resolution is therefore 10 dots per mm. When the ratio of the diameter of the light emerging or emitting aperture of the light-emitting diode 1 to the diameter of the spot of light 29 focused on the photosensitive medium 5 is 0.6:1, then with the light-emitting diode with the light emitting aperture diameter of 0.09 mm, the spot of light with the diameter of 0.15 mm is focused. It follows therefore that in order to attain a high picture element density, the pitch distance between the light-emitting diodes must be reduced. However, from the technical viewpoint, it is extremely difficult to reduce the pitch distance. In addition, the reduction in pitch distance will inevitably result in increase in fabrication cost. Furthermore, when it is desired to write a straight horizontal line image on the surface of the photosensitive medium, all the light-emitting diodes must be simultaneously turned on, so that a high instantaneous current flows and there arises a drawback that the load on a power supply is increased.

Figure 9B:
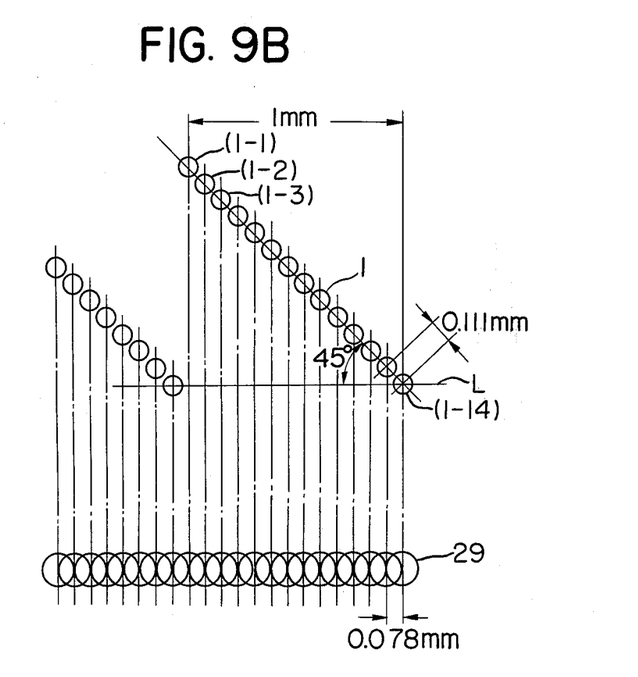
FIG. 9B is a view used for the explanation of the relationship between inclined arrays of light-emitting diodes and a resulting array of spots of light or picture elements.

When, as shown in FIG. 9B, the light-emitting diodes 1 are arranged at a pitch distance of 0.111 mm in an array inclined at 45° relative to the line L which indicates the direction perpendicular to the direction of the movement of the photosensitive medium 5, the pitch distance between the adjacent picture elements 29 becomes 0.078, so that 14 picture elements 29 are arrayed over the distance of 1 mm. The resolution is, therefore, increased to 14 dots per mm.

In order to form the picture elements 29 in a straight line as shown in FIG. 9B with such inclined light-emitting diode arrays, the light-emitting diodes 1-1, 1-2, 1-3 and so on in each array must be sequentially turned on in synchronism with the moving or rotating speed of the photosensitive medium 5.

Figure 10:
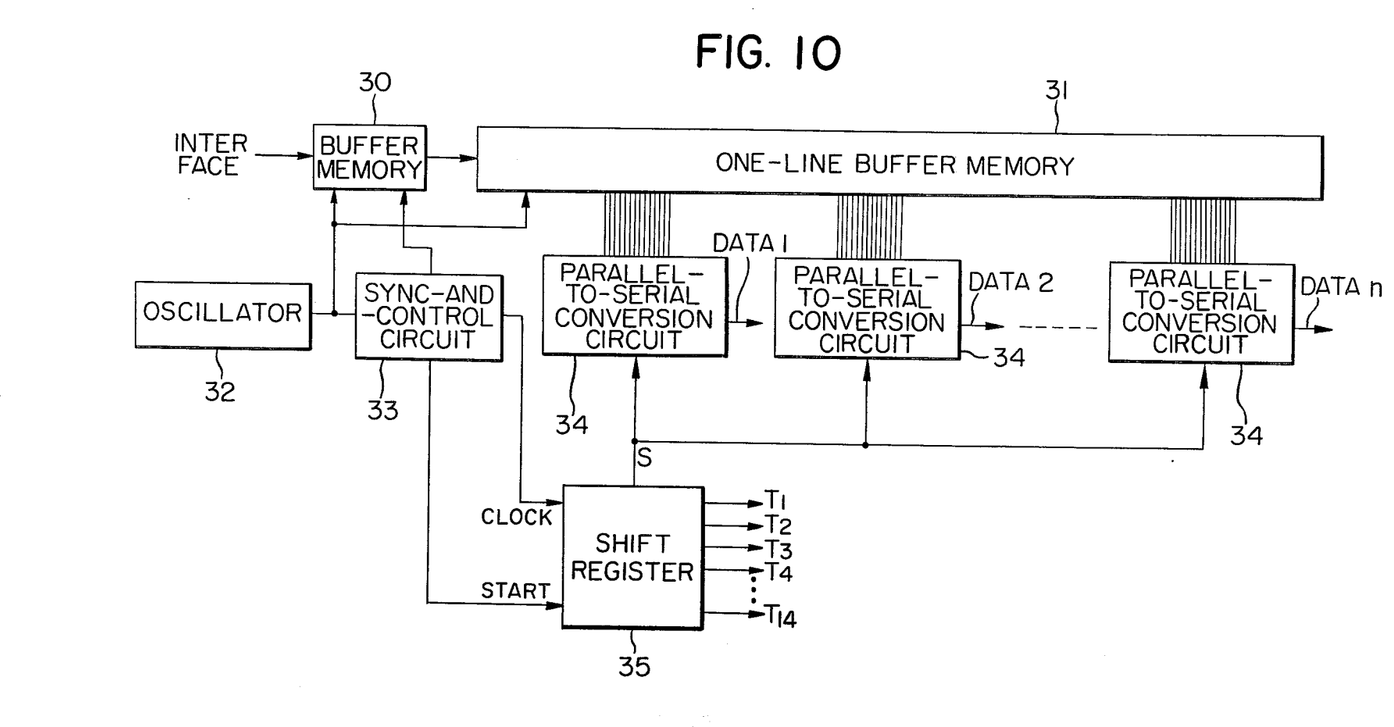
FIG. 10 is a diagram of a timing circuit used in the third embodiment.
Figure 11:
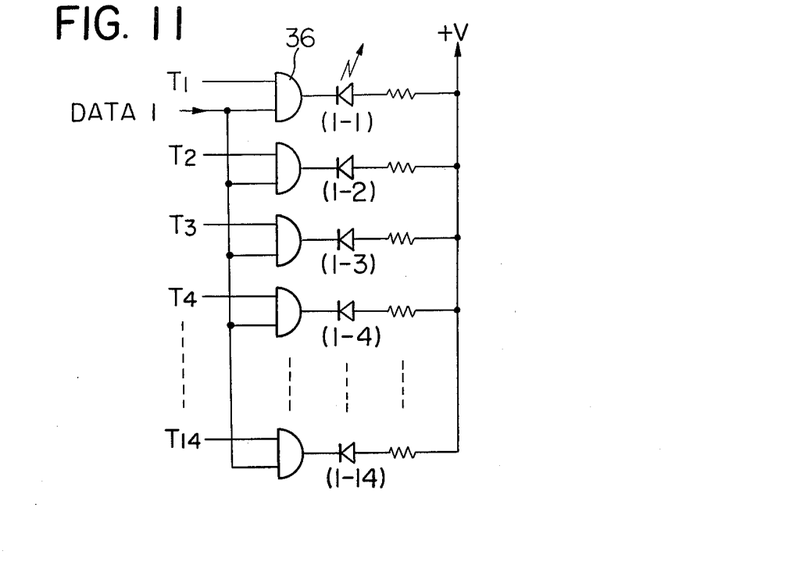
FIG. 11 is a diagram of a driver circuit used in the third embodiment.

To this end, the present invention provides a timing circuit as shown in FIG. 10 and driver circuits as shown in FIG. 11. The timing circuit includes a buffer memory 30 for storing character information and a (14×n) bit one-line buffer memory 31 which receives the picture element information in one line from the buffer memory 30. The number 14 represents the number of light-emitting diodes in one array and n represents the number of light-emitting diode arrays.

The timing circuit further includes an oscillator 32, a sync-and-control circuit 33, parallel-to-serial conversion circuits 34 each of which receives the picture element information in one array in parallel from the buffer memory 31 and delivers it in serial and a shift register 35 which receives a clock signal CLOCK and a start signal START from the sync-and-control circuit 33 and delivers not only the shift signal S which controls the parallel-to-serial conversion circuits 34 but also signals $T_1$ through $T_{14}$ serially.

The driver circuit shown in FIG. 11 receives the picture element information DATA 1 from the parallel-to-serial conversion circuit 34 and the timing signals $T_1$ through $T_{14}$ so as to turn on the diodes 1-1 through 1-14 sequentially. The driver circuit includes 14 AND gates 36 the output of which in turn are connected to respective light-emitting diodes 1-1 through 1-14. Therefore, when one of the AND gates 36 simultaneously receives the DATA 1 signal and the timing signal T, the light-emitting diode 1 connected to the output of this AND gate is turned on. Therefore, when all AND gates 36 receive DATA 1 and the timing signal T, the light-emitting diodes 1-1 through 1-14 are sequentially turned on in synchronism with the moving speed of the photosensitive medium 5, the picture elements 18 are formed in a straight horizontal array as shown in FIG. 8. The driver circuit as shown in FIG. 11 must be equal in number n to the light-emitting diode arrays.

In summary, according to the third embodiment of the present invention, the pitch distance between the picture elements can be reduced without reducing the pitch distance between the light-emitting diodes, so that the resolution can be increased and subsequently the image quality can be improved. When a straight line is printed, the light-emitting diodes are sequentially turned on as described previously, so that it is not needed to flow a high current into the driver circuits and consequently a low current supply can be used.

Figure 12:
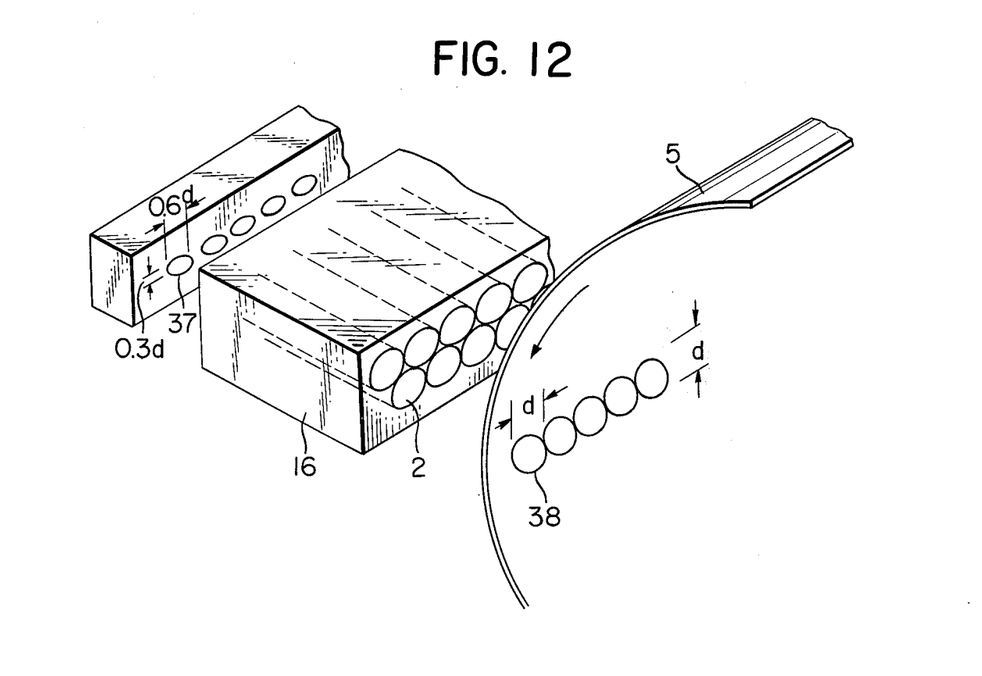
FIG. 12 is a schematic perspective view of a fourth embodiment of the present invention.

In FIG. 12 is shown a fourth embodiment of the present invention. The light emitting aperture 37 of each light-emitting diode is in the form of an ellipse whose major axis is perpendicular to the direction of the movement of the photosensitive medium 5, so that an almost circular picture element 38 is formed on the medium 5. In order to clearly show the light emitting apertures 37 and the picture elements 38, they are exaggerated in size in FIG. 12.

Figure 13A:
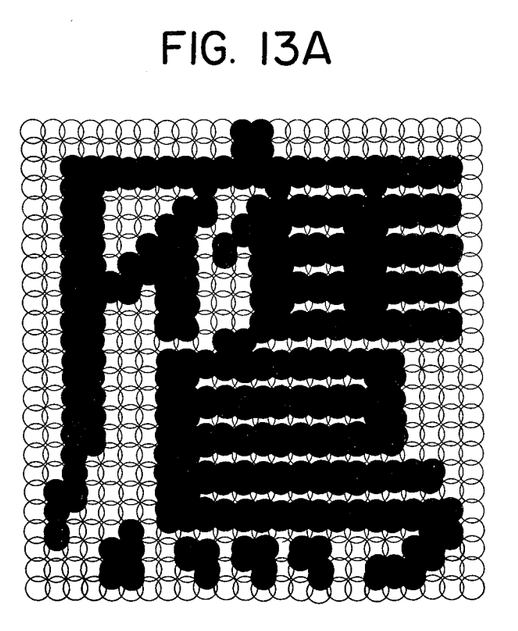
FIG. 13A shows a tone image obtained when each of the light-emitting diodes has a circular light-emitting aperture.
Figure 13B:
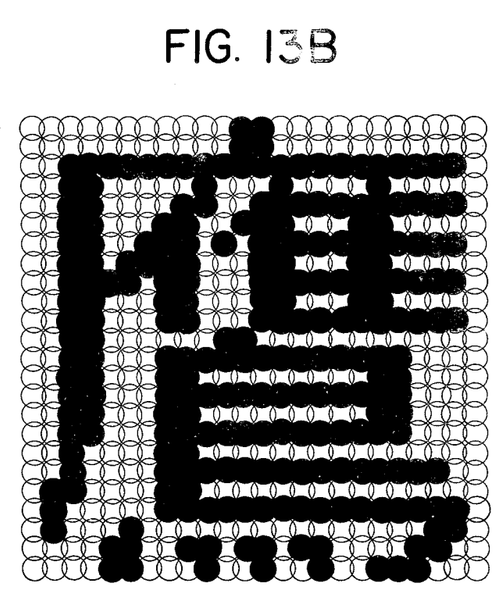
FIG. 13B shows a tone image obtained when each of the light-emitting diodes has an elliptical light-emitting aperture in accordance with the present invention.

When the light emitting diode has a circular light emitting aperture, a circular spot of light is focused on the photosensitive medium 5, but since the medium 5 is rotating, the picture element becomes an ellipse whose major axis is in the direction of the movement of the medium 5. It is assumed that the ratio in diameter between tne light emitting aperture and the spot of light be 0.6:1 and the light emitting aperture be 0.6 d in diameter. Then, the spot of light becomes d in diameter. Furthermore assume that the light-emitting diode be turned on for one msec and the medium 5 move at a speed of 0.5 d/msec. Then, the picture element is formed on the medium 5 as an ellipse whose major axis is 1.5 d and whose minor axis is d. With such elliptical picture elements, as shown in FIG. 13A, there remains no blank between the lines and the steps of an inclined line are unnaturally exaggerated. Thus, high image quality cannot be attained.

However, according to the fourth embodiment of the present invention, such drawbacks can be substantially eliminated. For instance, assume that the ratio between the major and minor axes of the elliptical light emitting aperture 37 of the light-emitting diode be 0.6 d:0.3 d and the ratio in diameter between the light emitting aperture 37 and the spot of light be 0.6:1. Then the spot of light has the major vs. minor axis ratio of d:0.5 d. However, since the photosensitive medium 5 moves over a distance of 0.5 d during the time interval 1 msec when the light-emitting diode is turned on, an almost circular picture element of a diameter of d is formed on the medium 5.

In summary, according to the fourth embodiment of the present invention, each of the light emitting diodes used has an elliptical light emitting aperture whose major axis is extended perpendicular to the direction of the movement of the photosensitive medium, so that an electrostatic latent image consisting of almost circular picture elements can be formed. As a result, blanks or margins remain between the lines and a "stairstep" imperfection in an inclined line can be minimized. Thus, the image quality can be remarkably improved.

In the prior art electrophotographic printing devices of the type comprising a combination of a light-emitting diode array and an optical fiber array, both arrays are fixedly mounted so that a predetermined distance may be maintained between a light source and a photosensitive medium. Meanwhile the optical fibers only serve to transmit the light rays. As a result, the diameter of a spot of light focused on the photosensitive medium is almost entirely dependent upon the diameter of the optical fiber, so that the diameters of picture elements of a character image are always equal. Therefore, as shown at (A) in FIG. 14, the size of a printed character can be varied by changing a dot matrix, but the width of the lines always remain same. That is, it has been impossible so far to change the width of lines. In order to increase the width of a line segment, spots of light or picture elements are partly overlapped in both the vertical and horizontal lines as shown at (B) in FIG. 14. However, to this end, the light-emitting diodes must be turned on and off many times, so that the power consumption increases and the service life of light-emitting diodes becomes shorter. In addition, it is apparent that the width of a line segment cannot be reduced less than the diameter of the picture element. However, according to the present invention, this problem can be overcome as will be described in detail below.

Figure 14:
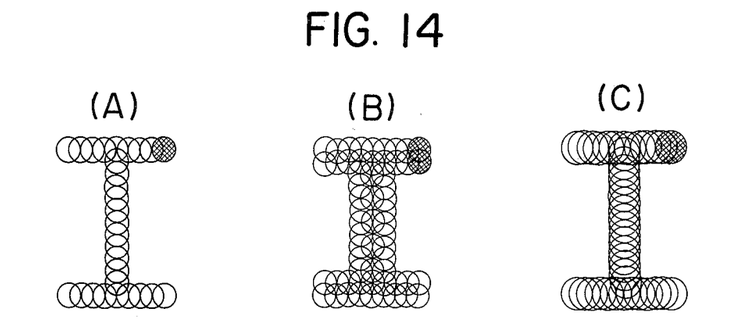
FIG. 14 shows an image (c) obtained by the fifth embodiment in comparison with the images (A) and (B) obtained by the electrophotographic printing device in which the diameter of picture elements is not variable.
Figure 15A:
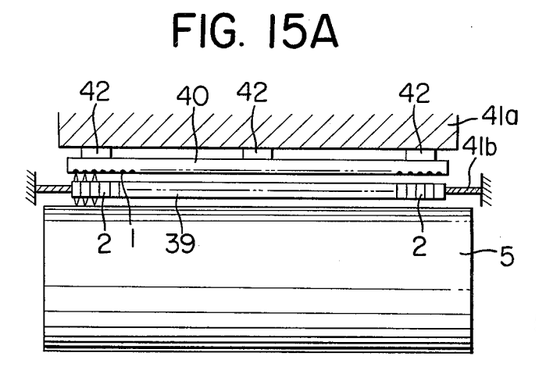
FIG. 15A is a schematic front view of a fifth embodiment of the present invention.
Figure 15B:
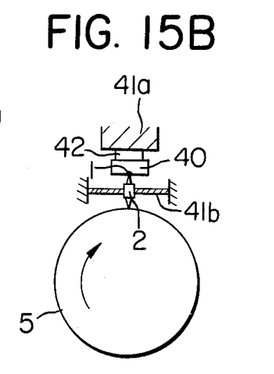
FIG. 15B is a side view thereof.

In FIGS. 15A and B is shown a fifth embodiment of the present invention comprising a combination of a light-emitting diode array 40 and a light-beam transmission-and-convergence means array 39. The light-emitting diode array 40 or the light-beam transmission-and-convergence means array 39 is displaced very finely relative to each other so that the diameter of the picture elements can be varied arbitrarily as shown at (C) in FIG. 14 and subsequently the width of a line segment can be arbitrarily varied.

The array 39 comprises a plurality of light-beam transmission-and-convergence means 2 of the type described previously which are disposed in an array in parallel with the axis of the photosensitive medium 5 (as best shown in FIG. 15A) in such a way that the axes of the light-beam transmission-and-convergence means 2 are perpendicular to the cylindrical surface of the medium 5 (as best shown in FIG. 15B). The array 40 comprises a plurality of light-emitting diodes 1 disposed in an array in parallel with and in opposed relationship with the array 39. The light-emitting diode array 40 is mounted on or suspended from a support 41a through piezoelectric elements 42 while the array 39 is mounted on a support 41b.

As described previously, each light-beam transmission-and-convergence means 2 not only transmits the light beam emitted from the corresponding light-emitting diode 1 but also converges or focuses the beam as an extremely spot on the medium 5 as a converging lens and the diameter of the spot of light thus focused is variable by changing the distance between the light-emitting diode 1 and its corresponding light-beam transmission-and-convergence means 2. Therefore, according to the fifth embodiment of the present invention, the piezoelectric elements or crystals 42 interposed between the light-emitting diode array 40 and its support 41a are excited or energized so that the distance from the light-emitting diode 1 to its corresponding light-beam transmission-and-convergence means 2 is extremely finely adjusted. In general, the piezoelectric element 42 can produce a maximum strain of 30 μm, so that it is best adapted to cause an extremely small displacement.

Thus, according to the fifth embodiment of the present invention, the voltage impressed across the piezoelectric elements 42 is varied so that the diameter of the picture elements can be arbitrarily varied and consequently a character having broad line segments as shown at (C) in FIG. 14 can be printed. Another advantage of the fifth embodiment resides in the fact that when the diameter of the picture elements is increased, the picture elements are more overlapped, so that sufficiently clear printed images can be obtained even when the resolution (dot/mm) is lowered.

So far the light-emitting diode array 40 has been described as being moved toward or away from the light-beam transmission-and-convergence means array 39, but it is understood that the same effect can be attained by moving the array 39 toward or away from the array 40 as will be described in detail below.

Figure 16:
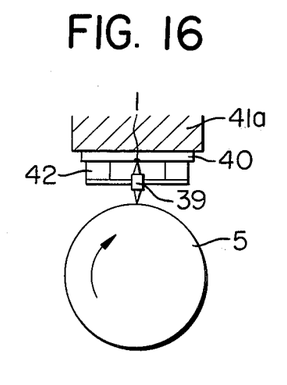
FIG. 16 shows a modification of the fifth embodiment.

In FIG. 16 is shown a modification of the fifth embodiment. The light-emitting diode array 40 is fixedly secured to the support 41a, but the light-beam transmission-and-convergence means array 39 is suspended from the support 41a through the piezoelectric elements 42.

Figure 17:
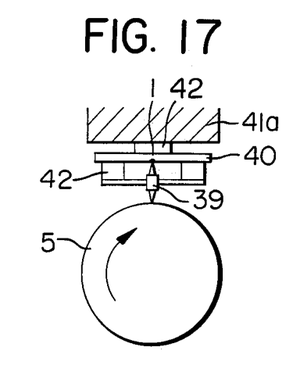
FIG. 17 shows another modification of the fifth embodiment.

In FIG. 17 is shown another modification of the fifth embodiment of the present invention. The light-emitting diode array 40 is suspended from the support 41a through the piezoelectric elements 42 and the light-beam transmission-and-convergence means array 39 is suspended from the array 40 through the piezoelectric elements 42. Therefore, both the arrays 39 and 40 can be moved toward or away from each other. It is quite apparent that both the modifications shown in FIGS. 16 and 17, respectively, can attain the same effects as the fifth embodiment shown in FIGS. 15A and B.

In summary, according to the present invention, the exposure unit can be made extremely compact in size by combining light-emitting diodes and light-beam transmission-and-convergence means such as converging lenses. In addition, the distance between the light emerging end of the light-beam transmission-and-convergence means and the surface of a photosensitive medium can be increased as compared with the prior art. As a consequence, the prior art supporting mechanisms which are complex in construction and which must be fabricated with a higher degree of accuracy can be completely eliminated, so that the fabrication costs can be considerably reduced. Moreover, the light-emitting diodes and the light-beam transmission-and-convergence means can be so combined as to obtain a high resolution and consequently high image qualities. So far with the prior art electrophotographic printing devices, it has been impossible to vary the diameter of the picture elements, but according to the present invention, the diameter or size of the picture elements can be arbitrarily varied, so that the width of line segments can be freely selected.

What is claimed is:
1. In an electrophotographic printing device of the type in which electrostatic latent images of characters and the like are formed on the surface of a photosensitive medium, an exposure unit comprising:
a first assembly of a plurality of light-beam transmission-and-convergence means whose one ends are disposed in opposed relationships with said surface of said photosensitive medium; and
a second assembly of a plurality of light-emitting diodes whose light-emitting apertures are disposed in opposed relationships with the other ends of the light-beam transmission-and-convergence means,
said second assembly comprising a plurality of light-emitting-diode-array chips each consisting of a predetermined number of light-emitting diodes,
said light-emitting-diode-array chips being disposed in a zig-zag array in the direction perpendicular to the direction of movement of said photosensitive medium, the light-emitting diode at one extreme end of the light-emitting diode array on each light-emitting-diode-array chip in one array or row of the zig-zag arrayed chips being adjacent to the light-emitting diode at one extreme end of the light-emitting-diode array on each light-emitting-diode-array chip in the other array or row of the zig-zag arrayed chips, so that said first-mentioned light-emitting diode is adjacent to said second-mentioned light-emitting diode, and the pitch between said light-emitting diode at one extreme end of the array on each said chip in said first array of chips and said light-emitting diode at one extreme end of the array on each said chip in said other array of chips is equal to the pitch between the adjacent light-emitting diodes on each chip.

2. An exposure unit as set forth in claim 1, wherein a spacer is interposed between said first assembly and said second assembly.

3. An exposure unit as set forth in claim 1, wherein said first assembly and said second assembly are assembled or integrated into a unitary construction.

4. An exposure unit as set forth in claim 1, wherein said plurality of light-beam transmission-and-convergence means of said first assembly are disposed in a zig-zag array in the direction perpendicular to the direction of movement of said photosensitive medium.

5. An exposure unit as set forth in claim 4, wherein one or more light-emitting diodes are disposed in opposed relationships with only the area in the proximity of the center of the other end of each corresponding light-beam transmission-and-convergence means.

6. An exposure unit as set forth in claim 1, wherein the axis of the light-emitting aperture of each light-emitting diode in the direction perpendicular to the direction of movement of said photosensitive medium is elongated as compared with the axis thereof in parallel with said direction of movement of said photosensitive medium.

7. In an electrophotographic printing device of the type in which electrostatic latent images of characters and the like are formed on the surface of a photosensitive medium, an exposure unit comprising:

a first assembly of a plurality of light-beam transmission-and-convergence means whose one ends are disposed in opposed relationships with said surface of said photosensitive medium; and a second assembly of a corresponding plurality of light-emitting diodes whose light-emitting apertures are disposed in opposed relationships with the other ends of the light-beam transmission-and-convergence means, said second assembly comprising a group of straight arrays each consisting of a predetermined number of light-emitting diodes inclined at a predetermined angle with respect to a line or the direction perpendicular to the direction of movement of said photosensitive medium, said arrays being disposed in parallel with each other;

a timing circuit for generating timing signals for determining the time at which each light-emitting diode is lighted;

a corresponding plurality of drive circuits, each drive circuit including a corresponding plurality of AND gates each of which is connected in series to each of the light-emitting diodes in each array; and means for applying a data signal to inputs of the AND gates for each light-emitting diode array and for applying said timing signals sequentially to the other inputs of said AND gates for each array, so that the light-emitting diodes in each array are turned on and off sequentially.

8. In an electrophotographic printing device of the type in which electrostatic latent images of characters and the like are formed on the surface of a photosensitive medium, an exposure unit comprising:

a first assembly of a plurality of light-beam transmission-and-convergence means whose one ends are disposed in opposed relationships with said surface of said photosensitive medium;

a second assembly of a corresponding plurality of light-emitting diodes whose light-emitting apertures are disposed in opposed relationships with the other ends of the light-beam transmission-and-convergence means; and means for displacing at least one of said first and second assemblies toward or away from the surface of said photosensitive medium by an extremely small distance, said displacing means comprising at least one piezoelectric element interposed between a stationary assembly supporting means and said second assembly or between said second assembly and said first assembly.

* * * * *